United States Patent [19]

Luttrell, Jr.

[11] Patent Number: 5,064,120

[45] Date of Patent: Nov. 12, 1991

[54] FIBERGLASS SPRAY-UP APPARATUS HAVING DISPLAY OF CUMULATIVE AMOUNT OF MATERIAL DISPENSED

[76] Inventor: Noel E. Luttrell, Jr., R. R. #2, Box 200-4, Freemont, Ind. 46737

[21] Appl. No.: 442,596

[22] Filed: Nov. 29, 1989

[51] Int. Cl.$^5$ ............................................. G01F 1/02
[52] U.S. Cl. ............................... 239/74; 239/DIG. 8
[58] Field of Search ............ 239/71, 74, 336, DIG. 8; 222/71, 154, 159; 73/861; 417/63

[56] References Cited

U.S. PATENT DOCUMENTS

| | | | |
|---|---|---|---|
| 1,946,275 | 2/1934 | Collins | 222/71 X |
| 2,224,540 | 12/1940 | Fraser | 222/71 X |
| 2,307,435 | 1/1943 | Van Opel | 222/71 X |
| 3,212,676 | 10/1965 | Trumbull et al. | 222/71 |
| 3,578,212 | 5/1971 | Greiner | 222/71 |
| 4,549,853 | 10/1985 | Gasper et al. | 417/63 X |
| 4,736,871 | 4/1988 | Luciani et al. | 272/71 X |
| 4,789,100 | 12/1988 | Senf | 222/71 X |
| 4,809,909 | 3/1989 | Kukesh | 239/1 |

OTHER PUBLICATIONS

Venus-Gusmer 5th Edition catalog, copyright 1988, p. 122.

Primary Examiner—Andres Kashnikow
Assistant Examiner—Kevin P. Weldon
Attorney, Agent, or Firm—Jeffers, Hoffman & Niewyk

[57] ABSTRACT

Apparatus for use in spray-up construction of a fiberglass article in an open mold includes a manually operable spray gun for spraying liquid resin and liquid catalyst, and for chopping and emitting fiberglass roving together with the resin. A positive displacement resin and catalyst pump operated by an airmotor pumps resin and catalyst to the spray gun. A pneumatic electrical switch on the air-motor monitors air exhaust therefrom and is closed upon each air-exhaust pulse. The number of air-exhaust pulses of the air-motor is proportional to the cumulative amount of resin pumped. An electronic counter electrically connected to the pneumatic switch counts the number of switch closings and drives an LCD numerical display which displays the number of pulses counted. The LCD display is located on the spray gun where it can be seen by the operator during operation of the spray gun, such that the operator is continually apprised of the amount of resin which has been dispensed. Thus, the operator can stop the spray-up operation when a predetermined amount of resin has been applied to the mold. An air driven fiberglass chopper on the spray gun is supplied with air from a compressed air supply. A flow meter in line with the compressed air supply is located proximate the spray gun in view of the operator to apprise him of the rate of flow of air to the chopper.

27 Claims, 2 Drawing Sheets

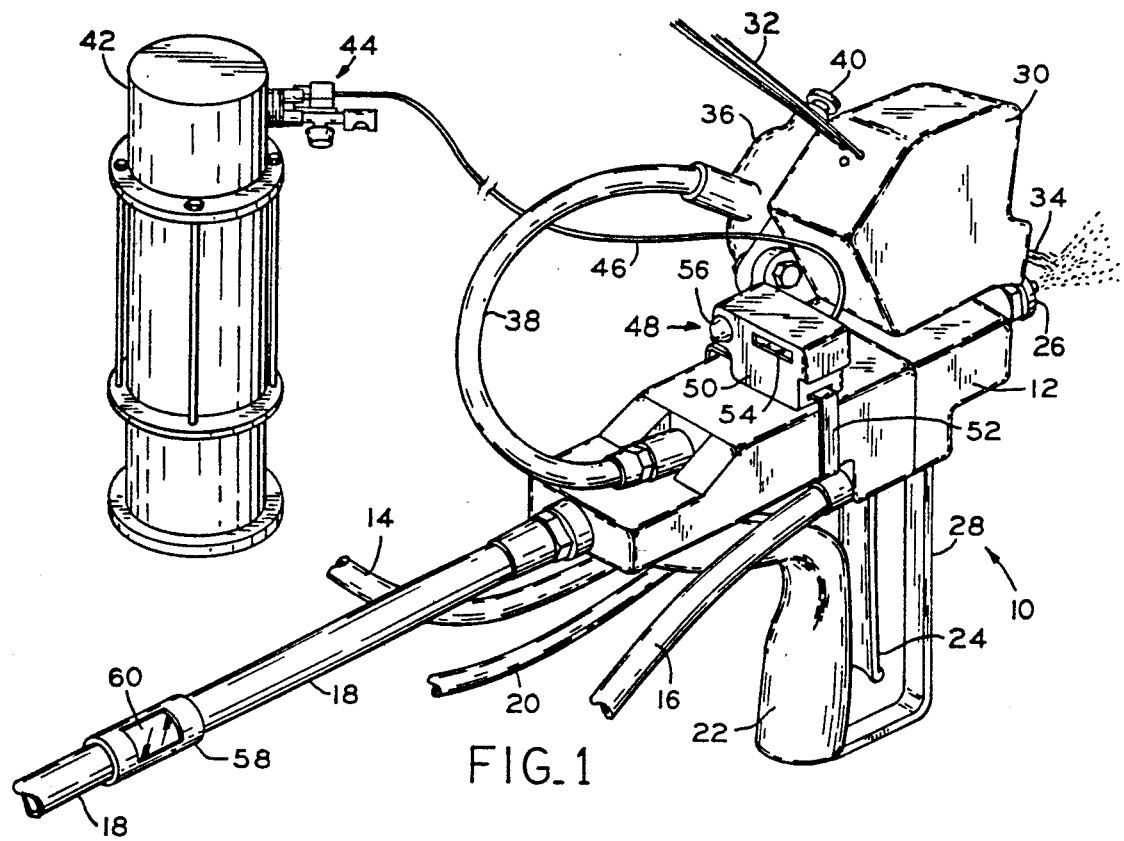
FIG_1
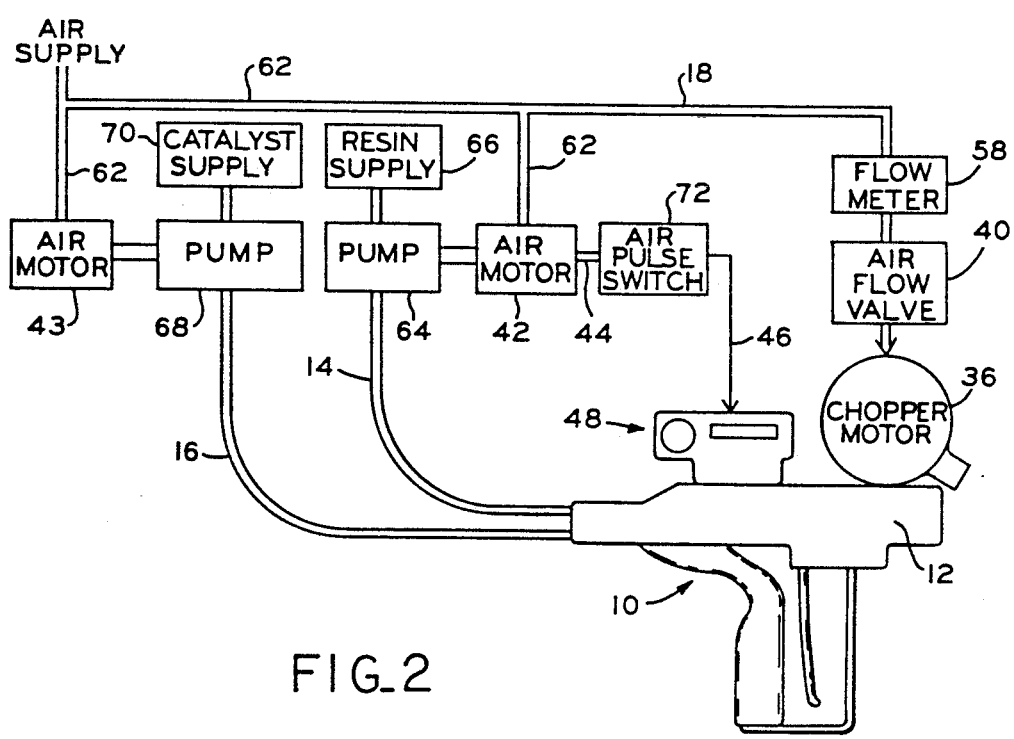
FIG_2

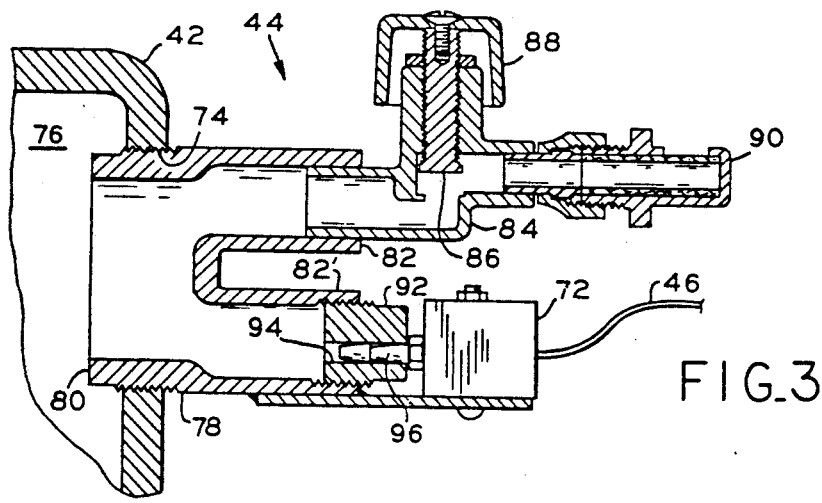
FIG.3
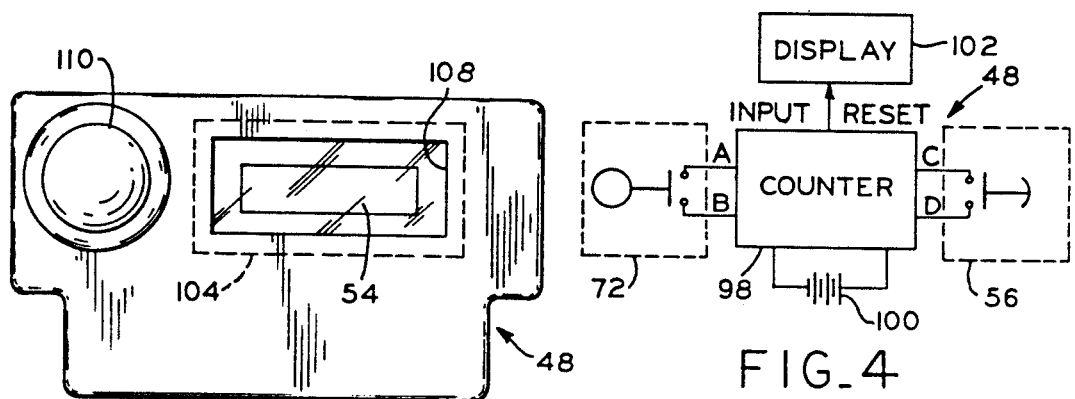
FIG.5
FIG.4
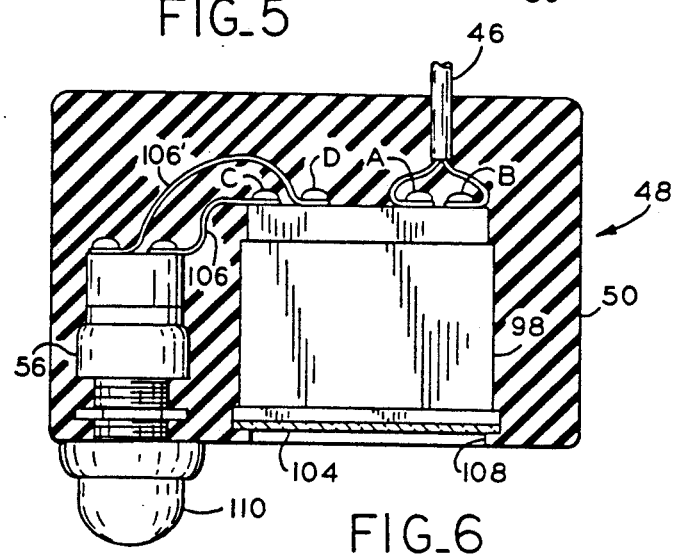
FIG.6

FIBERGLASS SPRAY-UP APPARATUS HAVING DISPLAY OF CUMULATIVE AMOUNT OF MATERIAL DISPENSED

BACKGROUND OF THE INVENTION

The present invention relates generally to the spray-up technique for forming fiberglass articles in an open mold, and more particularly to an apparatus therefor which permits greater control of the amount of material dispensed during spray-up.

One procedure for forming fiberglass articles is known as open-mold spray-up, which involves spraying resin and catalyst together with chopped glass fibers continuously from a gun onto an open mold which delimits the outer surface of the article to be formed. Examples of articles formed by this procedure include boat hulls and wind fairings for trucks.

It has been a problem since the advent of the spray-up technique that a relatively high level of skill needs to be achieved by the operator through experience with the spray-up gun before he can produce consistently uniform articles. The operator needs to learn to spray the material onto the mold by starting at a particular point and moving the gun evenly at a particular speed and in a particular pattern, while holding to a certain overlap of the spray pattern. Having mastered the foregoing, he must also learn to gauge by sight and by a sense of elapsed time when a sufficient amount of material has been applied to the mold without exceeding the desired amount. If the amount of fiberglass material applied is too little, the product may fail to meet its design objectives. If the amount of fiberglass applied is too great, the part may again fail to meet the design objectives; but even if the part is acceptable, there will have been a waste of expensive materials which reduces the profitability of the venture.

It has been observed that even a skilled operator can only maintain a tolerance of about 10% of the design weight of the article using only his natural sensory skills. Furthermore, to train a new operator to the point where he can achieve the level of skill described above requires a matter of several weeks, during which time much production time is lost and much material is wasted. As a result, the spray-up fiberglass industry is undesirably dependent on those individual workers who have achieved the necessary skill level.

It would be desireable to provide an improved spray-up apparatus which would enable skilled workers to repeatedly produce spray-up fiberglass articles in open molds while maintaining a consistent unit weight with a smaller percent tolerance than was heretofore possible.

Furthermore, it would be desireable to provide such an improved spray-up apparatus which would reduce the level of skill necessary to produce acceptable articles, thereby enabling new operators to be trained in a lesser amount of time.

One way in which the operator can be assisted in producing articles of consistent weight is the provision of a meter which measures a cumulative amount of dispensed resin and which alerts the operator when the desired amount has been dispensed. A known commercially available digital resin meter includes an optical sensor attached to the pump shaft of the resin pump which sends pulses to the meter as the pump moves. The meter counts the pulses and closes an electrical circuit when a preset number has been reached. This circuit may be used to ring a bell, turn on a light, or close an air line valve to an automatic gun.

One disadvantage of the above-described meter is that it is located remotely from the operator, generally proximate the pump itself. For this reason, the operator cannot directly view a readout of the numerical display during operation of the spraygun, but must depend upon the alarm circuit to inform him when the desired number has been reached. This necessarily requires that the desired number be preset at the meter at a location away from the operating position. The operator must therefore return to the meter after spray-up of each article to reset the meter, and to change the preset number in the event that an article of a different weight from the just completed article is to be sprayed-up.

Merely relocating the aforementioned meter to a position proximate the operator is not feasible because of the harsh environment in the vicinity of the spray-gun operating position. Stray resin, catalyst and chopped fiberglass would soon coat the meter, obscuring the numerical readout. Furthermore, the chemicals used as components of the fiberglass articles and the solvents used for clean up would be harmful to electronic circuitry and quickly result in the failure of the unit.

The problems associated with the known meter discussed above are solved by the present invention.

SUMMARY OF THE INVENTION

The present invention involves an apparatus for spray-up forming of fiberglass articles wherein the apparatus includes a visually perceptible display located on the spray-gun where it can be viewed by the spray-up operator continuously during the spray-up operation, and wherein the display is indicative on a real-time basis of the cumulative amount of resin dispensed.

The invention enables the operator to consistently achieve uniform weights of successively produced identical fiberglass articles. Through brief experiment, a specific counter numerical indicia can be correlated with a specific weight of resin dispensed. Therefore, the operator can know when the correct amount of fiberglass has been applied to the mold simply by monitoring the display and stopping application as soon as the counter indicates that the desired weight of dispensed resin has been achieved. As a result, production of articles within a weight tolerance of about 1% can be accomplished.

The invention also enables a new operator to be trained in a lesser amount of time than heretofore since he need not acquire the skill to visually gauge and estimate the amount of material which has been applied. He need only learn the required spray pattern, gun movement speed, and optimum spray overlap. The latter skills are much more quickly acquired than the former. Once operation and movement of the gun are learned by the new operator, he can depend on the counter display to let him know when to release the trigger and stop applying material.

A further aspect of the present invention involves the provision of a pneumatically actuated electrical switch which is exposed to the air exhaust of an air-motor driven positive displacement resin and catalyst pump. The number of air pulses of the air-motor is proportional to the amount of material pumped. Consequently, the number of momentary switch closures of the pneumatic switch is also proportional to the cumulative amount of resin which has been dispensed. The switch closures are counted by an electronic counter which is electrically connected to the pneumatic switch, and the count is visually displayed by an LCD numerical display. The LCD display is located in a position such that it is visible and intelligible to the operator during the spray-up operation.

Yet another aspect of the present invention involves the provision of an electronic counter and display which are potted in a material which is resistant to the chemical components of the fiberglass material and to the solvents used to clean up the spray-gun. This enables the counter and display to be mounted directly on the spray-gun in a position where it is continuously visible to the operator as he looks over the spray-gun during the spray-up operation. The display is located in his line of sight such that he need not divert his attention away from the mold during spray-up. In addition, since the operator is aware of the specific numerical count to be achieved for each particular article to be constructed, he need not involve himself in setting the counter for different articles. He need only stop spraying at the appropriate count for the article under construction.

The invention, in accordance with one aspect thereof, provides a spray-up apparatus operable by a human operator to spray liquid onto an open mold located proximate the operator. The apparatus includes a manually controlled spray gun including a spray nozzle and pump means for pumping the liquid to the spray nozzle. A display means, responsive to pumping of the pump means, is provided for displaying a visually perceptible indicia indicative of cumulative amount of liquid pumped to the spray nozzle by the pump means, the indicia of the display means being mounted to the spray gun and sized so as to be continuously visible and intelligible to the operator during operation of the spray gun.

The invention, in accordance with another aspect thereof, provides a fiberglass spray-up apparatus operable by a human operator to spray a liquid and chopped fiberglass roving onto an open mold located proximate the operator. The apparatus includes a manually controllable spray gun including a spray nozzle and pump means for pumping the liquid to the spray nozzle. Fiberglass roving chopper means are provided on the spray gun for receiving and chopping fiberglass roving, the chopper means being driven by an air-motor. A compressed air supply means for supplying air under pressure to the air-motor of the chopper means is also provided, and flow meter means are connected in communication with the compressed air supply means between the air supply means and the air-motor of the chopper means, the flow meter means being located proximate the spray gun in a position in which it is visible and intelligible to the operator of the spray gun during operation thereof.

It is an object of the present invention to provide an improved spray-up apparatus which enables the operator to receive an indication that the amount of material dispensed has reached a predetermined amount for a given article.

Other objects and advantages of the present invention will be apparent from the following descriptions of a preferred embodiment.

BRIEF DESCRIPTION OF THE DRAWINGS

FIG. 1 is a perspective view of a fiberglass chopper gun in accordance with the present invention and useful for spray-up forming of fiberglass articles, shown together with the air motor portion of a resin pump and a catalyst pump used therewith;

FIG. 2 is a schematic diagram of the fiberglass chopper gun of FIG. 1 and its associated supply system;

FIG. 3 is a cross-sectional view of an air exhaust manifold of the air motor of FIG. 1, particularly showing a pneumatic electrical switch sensor used therewith;

FIG. 4 is a block schematic diagram of an electronic counter used in connection with the chopper gun and air motor of FIG. 1;

FIG. 5 is a front elevational view of the electronic counter and its housing as used in connection with the chopper gun of FIG. 1; and FIG. 6 is a cross-sectional view of the counter and housing of FIG. 5.

DESCRIPTION OF THE PREFERRED EMBODIMENT

Referring in particular to FIG. 1, there is illustrated a fiberglass chopper gun 10 in accordance with the present invention. Gun 10 includes a gun block 12 in which is received resin supply line 14, catalyst supply line 16, and compressed air supply line 18. A flush line 20 also received in block 12 communicates internally within block 12 with resin and catalyst supply lines 14 and 16 to provide a path for flushing the gun block and supply lines with solvent. Block 12 is fitted with a handle 22. A trigger lever 24 pivotally mounted to block 12 controls internal valves within block 12 for stopping and starting flow of resin and catalyst from supply lines 14 and 16, and flow of air from air supply line 18. Resin and catalyst, which are supplied under pressure through supply lines 14 and 16, are mixed internally in gun block 12 and sprayed through spray nozzle 26 upon manual activation of trigger lever 24. Trigger guard 28 is attached to block 12 and to the lower end of handle 22 and encircles trigger lever 24 to prevent accidental activation of the trigger.

Disposed on the top and at the fore of gun block 12 is a rotary chopper 30 which receives continuous glass fibers or roving 32, and which chops the roving into discrete lengths of glass fiber 34 which are expelled to the front of gun block 12 where they are entrained with the resin/catalyst spray from nozzle 26. Compressed air supplied through air supply line 18 communicates internally within gun block 12, through a valve which is controlled by trigger lever 24, with line 38 which emanates from gun block 12 and is connected to an air-powered motor 36 which drives chopper 30. The speed of air-powered motor 36 is adjustable by adjusting the flow of air therethrough via valve 40.

Also illustrated in FIG. 1 is the air-motor 42 of a positive displacement pump for pumping liquid resin and liquid catalyst separately through supply lines 14 and 16. The pump portion and its connection to lines 14 and 16 is not illustrated in FIG. 1, but is shown schematically in FIG. 2, to be described further below. Air-motor 42 is driven by an air supply providing a source of compressed air (see FIG. 2). Air motor 42 has an air exhaust manifold 44 which includes a pneumatic switch which is activated by air exhaust pulses and is electrically connected to gun 10 through shielded coaxial cable 46. Exhaust manifold 44 is described in greater detail below with reference to FIG. 3.

Referring again to FIG. 1, it can be seen that cable 46 from exhaust fitting 44 is connected to counter display unit 48 of gun 10. Counter display unit 48 includes a housing 50 fixed to gun block 12 by attachment straps 52. A liquid crystal display (LCD) visual numerical display window 54 is positioned on a face of housing 50 which faces rearward of gun 10, i.e., toward the operator, so that the LCD display is visible to the operator at all times during use of gun 10. A reset button 56 is likewise located on that same rearward face of housing 50 in order to be readily accessible to the operator.

An in-line flow meter 58 having a visual display 60 is located in air supply line 18 proximate gun 10 within view of the operator so that the air flow delivered to gun 10 can be monitored by the operator and adjusted if necessary through air flow valve 40 in order to set the speed of air-motor 36 and chopper 30 to a desired value. The amount of chopped glass fiber 34 emitted from chopper 30 per unit time is proportional to the speed of chopper 30 which in turn is proportional to the flow rate of air therethrough. The ratio of fiberglass to resin emitted by gun 10 can be maintained at a desireable ratio of 30% glass, 70% resin by noting through experiment the air flow rate at which the desired ratio is achieved, and periodically monitoring flow meter 58 to verify that the flow rate is correct. In particular, the experimental procedure involves spraying resin and fiberglass from the gun at a particular air flow setting and weighing the dispensed materials to determine the ratio of fiberglass to resin as dispensed. If necessary, the air flow is adjusted and the experiment is repeated until the desired ratio is achieved. The reading of the air flow meter at which the desired ratio is achieved is then noted and the meter is periodically monitored to make sure that the noted flow rate is maintained. A suitable unit for flow meter 58 is Model 671-020 marketed by Hedland, Racine, Wis., which measures and indicates a flow rate of 2 to 20 standard cubic feet per minute at a pressure level of 100 psig nominally.

Referring to FIG. 2, there is illustrated schematically the arrangement of chopper gun 10 with respect to the remainder of the fiberglass spray-up system used therewith. Air motor 42, which is connected to a compressed air supply by air line 62, drives a resin pump 64 which draws liquid resin from resin supply 66 and delivers it under pressure through resin supply line 14 to gun block 12. Air motor 43 similarly drives a catalyst pump 68 which draws liquid catalyst from catalyst supply 70 and delivers it under pressure through catalyst supply line 16 to gun block 12. Pumps 64 and 68 are positive displacement pumps driven in synchrony with each other. The relative size and stroke of each is set to assure a virtually constant ratio of pumped resin to pumped catalyst on a volume basis. Compressed air from the air supply also is delivered through air supply line 18 and flow meter 58 to chopper motor 36 via air flow valve 40. By monitoring flow meter 58 and adjusting air flow valve 40, the amount of air delivered to chopper motor 36 per unit time can be set to a desired value. An air pulse switch 72 connected to air exhaust manifold 44 is momentarily activated upon each pulse of exhaust air from air motor 42, of which there are two such pulses per cycle of the resin and catalyst pumps. Switch 72 is electrically connected to display unit 48 by cable 46. Display unit 48 contains an electronic counter which is incremented with each pulse of exhaust air of air-motor 42. Consequently, display unit 48 displays in real-time a cumulative total count of air pulses, which is directly proportional to the amount of resin and catalyst which has been delivered to gun 10 by the reciprocating piston in pump 64. Thus, the operator has available to him at all times a quantified visual indication of the cumulative amount of resin dispensed since the counter was last reset.

Referring to FIG. 3, exhaust manifold 44 is illustrated in greater detail. Air motor 42 has a threaded aperture 74 in a wall thereof communicating with an exhaust air chamber 76. Threadedly received in aperture 74 is a hollow adapter 78 having a first end 80 threadedly engaged with aperture 74 in an airtight manner, and a bifurcated second end 82, 82'. Second end 82 has mounted thereto a throttling valve body 84 having a valve closure body 86 threadedly received therein. Valve handle 88 attached to closure body 86 permits rotation thereof and restriction of air flow through valve body 84. An air filter 90 terminates valve body 84. Second end 82' has mounted thereto a closure plug 92 which terminates and occludes end 82' except for an aperture 94. Received in aperture 94 in sealing engagement therewith is a nipple 96 of pneumatically activated switch 72 which is sensitive to air pressure changes at nipple 96. Each air pressure pulse in air exhaust chamber 76 of air motor 42 activates switch 72 causing a momentary closure of electrical contacts within the switch. The electrical contacts are each connected to a respective electrical conductor of a shielded twoconductor coaxial cable 46, which is in turn connected to an electronic counter in display unit 48, as described below. In the preferred embodiment, pneumatic switch 72 requires a pressure of about 6 psig for activation. The purpose of throttling valve 84 is to permit the exhaust of air from air motor 42 to be adjustably restricted. This permits a setting of valve 84 to be selected which insures that pressure within manifold 44 builds up to at least 6 psig upon each exhaust pulse so as to activate switch 72. Switches of greater or lesser sensitivity would require appropriate adjustment of valve 84.

Referring to FIG. 4, a block diagram of display unit 48 and its associated connections is illustrated. Display unit 48 includes a counter module 98 powered by a self-contained battery 100, and a visually readable numerical LCD display 102. Counter module 98 has an input which is responsive to shorting of input terminals A and B. Each momentary shorting of terminals A and B causes the counter to be incremented by one and the numerical LCD display 102 to be advanced by one. Terminals A and B are connected to pneumatic switch 72 which is mounted to air motor 42 as described above. Counter 98 also includes reset circuitry which is responsive to shorting of reset terminals C and D. Each momentary shorting of terminals C and D causes the counter and the numerical LCD display 102 to be reset to zero. Terminals C and D are connected to reset pushbutton 56.

Referring to FIGS. 5 and 6, counter 48 is shown in greater detail. A self-contained battery-powered incremental counter module 98 is contained within housing 50. A suitable unit for counter module 98 is Model 7600 marketed by Redington Counters Inc., 130 Addison Road, P.O. Box 608, Windsor Conn. 06095. Module 98 includes an LCD display window 54 covered and protected by a glass pane 104. Electrically connected to the input terminals A and B of counter module 98 is cable 46 from pneumatic switch 72. Electrically connected to reset terminals C and D of counter module 98 via conductors 106, 106' is momentary push button 56. Counter module 98, push button 56 and the associated interconnecting conductors are embedded or potted in a block of silicone rubber molded thereabout as housing 50. A perimetrical lip 108 of housing 50 overlies the perimeter of glass pane 104, thereby providing a seal between housing 50 and glass pane 104. A flexible synthetic rubber boot 110 covers the button portion of switch 56. Input cable 46 is embedded in the silicone rubber material of housing 50 where it exits therefrom. Consequently, the electronic components mounted within housing 50 are hermetically sealed therein away from the atmosphere and away from contact with any of the chemicals in the environment of gun 10, including those chemicals used as constituent components of the fiberglass product and also those chemicals used as solvents for flushing and cleaning gun 10. The silicone rubber material of which housing 50 is constructed is resistant to all such chemicals as are normally used in and about gun 10. Such chemicals include acetone, polyester resin, methyl ethyl ketone, peroxide and methylene chloride. A suitable material for housing 50 is 3112 Silastic Silicone Rubber manufactured by Dow Corning Corporation, Midland, Mich. 48640.

A suitable spray-up gun and supply system as shown in FIGS. 1 and 2 is the Venus H.I.S. Model 80 Chopper Unit marketed by Venus-Gusmer, 1862 Ives Avenue, Kent, Wash. 98032. The embodiment illustrated herein is a modified version of such a commercially available unit. Display module 48 and exhaust manifold 44 and the components associated therewith and their interconnections, as well as flow meter 58, have been added to what is otherwise a commercially available and known unit.

In operation, gun 10 is held by handle 22 in the hand of an operator who points it toward an open mold. If necessary, display unit 48 is first reset so that display window 54 displays a cumulative count of zero. The operator then actuates the trigger and commences to move gun 10 over the open mold in a desired pattern and at a desired speed, repeating the pattern as the article is built-up or sprayed-up on the mold. The operator looks at and monitors display unit 48 noting the numerical count indicated in display window 54 as he continues to spray fiberglass material on the mold. When the count displayed reaches a predetermined value for the particular article being constructed, the operator knows that the correct amount of material has been dispensed and he releases the trigger of gun 10 and discontinues application of material to the mold. This process, along with such other additional conventional steps as may be associated with the known spray-up technique, is repeated for each new article to be sprayed-up.

It should be appreciated that the foregoing description has been with regard to a two-part resin/catalyst system in which the resin to catalyst ratio is about 100:1. Consequently, the numerical counter display is most conveniently correlated with the amount of resin dispensed. It should also be appreciated that the invention can be applied equally well to systems wherein two liquid components are mixed in a 1:1 ratio. In such systems, the counter display can be correlated with either component.

An alternative technique of using the counter display of the present invention involves using a count-down counter. The counter is set to a desired numerical value corresponding to the amount of resin which is desired to be dispensed, and the spray gun is operated until the counter counts down to zero. The present embodiment has been described in particular with respect to a pneumatically operated switch actuated by the exhaust pulses of the air motor of the resin pump. It should also be appreciated that other means for generating a signal in proportion to the operation of the resin pump are possible. For instance, a mechanical limit switch actuated by the reciprocal motion of the resin pump piston would also work.

While the present invention has been particularly described in the context of a preferred embodiment, it will be understood that the invention is not limited thereby. Therefore, it is intended that the scope of the invention include any variations, uses or adaptations of the invention following the general principles thereof and including such departures from the disclosed embodiment as come within known or customary practice in the art to which the invention pertains and which fall within the appended claims or the equivalents thereof.

What is claimed is:

1. A spray-up apparatus operable by a human operator to spray liquid onto an open mold located proximate the operator, the apparatus comprising:
   a manually controlled spray gun for spraying hardenable liquid resin into a mold, said gun including a spray nozzle;
   pump means communicating with the spray nozzle for pumping the liquid resin to the spray nozzle;
   display means, responsive to pumping of said pump means, for displaying a visually perceptible indicia indicative of a cumulative amount of liquid resin pumped to the spray nozzle by said pump means, the indicia of said display means being mounted to said spray gun and sized so as to be continuously visible and intelligible to the operator during operation of said spray gun.

2. The apparatus of claim 1, in which said pump means operates cyclically and pumps a determinate amount of liquid resin with each cycle thereof, the indicia of said display means being a numerical display wherein the number displayed is directly proportional to a cumulative amount of liquid resin pumped.

3. The apparatus of claim 2, in which said display means includes means for counting cycles of said pump means and the number displayed by the numerical display is directly proportional to the number of cycles counted.

4. The apparatus of claim 3, in which the means for counting includes a momentary electrical switch which is closed by said pump means a fixed number of times per cycle of said pump means.

5. The apparatus of claim 4, in which the means for counting includes electronic counter means electrically connected to the momentary electrical switch and responsive thereto for counting the number of switch closures.

6. The apparatus of claim 5, in which the counter means includes means for manually resetting the count to zero.

7. The apparatus of claim 3, in which said display means is mounted to said spray gun.

8. The apparatus of claim 5, in which the electronic counter means is mounted to said spray gun.

9. The apparatus of claim 8, in which the electronic counter means is potted in a material which is resistant to solvent.

10. The apparatus of claim 4, in which the pump means includes a pump driven by an air-motor, the air-motor generating a fixed number of air exhaust pulses per cycle, the electrical switch being a pneumatically actuated switch and being exposed to the air exhaust pulses of the air-motor.

11. The apparatus of claim 10, and further including an air exhaust manifold on the air-motor in communication with the air exhaust pulses, the exhaust manifold including an exhaust restriction which causes air pressure in the exhaust manifold to build up upon occurrence of each air exhaust pulse to a value sufficient to close the pneumatic switch.

12. The apparatus of claim 11, in which the exhaust restriction is a manually operable throttling valve.

13. A fiberglass spray-up apparatus operable by a human operator to spray a liquid and chopped fiberglass roving onto an open mold located proximate the operator, the apparatus comprising:
   a manually controllable spray gun including a spray nozzle;
   pump means communicating with the spray nozzle for pumping the liquid to the spray nozzle;
   fiberglass roving chopper means on the spray gun for receiving and chopping fiberglass roving, the chopper means being driven by an air-motor;
   compressed air supply means for supplying air under pressure to the air-motor of the chopper means; and
   flow meter means connected in communication with the compressed air supply means between the air supply means and the air-motor of the chopper means, the flow meter means being located proximate the spray gun in a position in which it is visible and intelligible to the operator of the spray gun during operation thereof.

14. The apparatus of claim 13, in which the air-motor of the chopper means includes valve means for adjusting air flow through the air-motor.

15. A fiberglass spray-up apparatus operable by a human operator to spray liquid and chopped fiberglass roving onto an open mold located proximate the operator, the apparatus comprising:
   a manually operable spray gun including a spray nozzle;
   pump means communicating with the spray nozzle for pumping the liquid to the spray nozzle;
   fiberglass roving chopper means on the spray gun for receiving and chopping fiberglass roving, the chopper means being driven by an air-motor;
   compressed air supply means for supplying air under pressure to the air-motor of the chopper means;
   flow meter means connected in communication with the compressed air supply means between the air supply means and the air-motor of the chopper means, the flow meter means being located proximate the spray gun in a position in which it is visible and intelligible to the operator of the spray gun during operation thereof; and
   display means, responsive to pumping of said pump means for displaying a visually perceptible indicia indicative of a cumulative amount of liquid resin pumped to the spray nozzle by said pump means, the indicia of said display means being sized and located so as to be continuously visible and intelligible to the operator during operation of said spray gun.

16. The apparatus of claim 15, in which the visually perceptible indicia is mounted to said spray gun so as to move together with said spray gun during operation thereof.

17. The apparatus of claim 15, in which said pump means operates cyclically and pumps a determinate amount of liquid with each cycle thereof, the indicia of said display means being a numerical display wherein the number displayed is directly proportional to a cumulative amount of liquid pumped.

18. The apparatus of claim 17, in which said display means includes means for counting cycles of said pump means and the number displayed by the numerical display is directly proportional to the number of cycles counted.

19. The apparatus of claim 18, in which the means for counting includes a momentary electrical switch which is closed by said pump means a fixed number of times per cycle of said pump means.

20. The apparatus of claim 19, in which the means for counting includes electronic counter means electrically connected to the momentary electrical switch and responsive thereto for counting the number of switch closures.

21. A spray-up apparatus operable by a human operator to spray liquid resin onto an open mold located proximate the operator, the apparatus comprising:
   a manually controlled spray gun including a spray nozzle;
   pump means communicating with the spray nozzle for pumping the liquid resin to the spray nozzle;
   display means, responsive to pumping of said pump means, for displaying a visually perceptible indicia indicative of a cumulative amount of liquid resin pumped to the spray nozzle by said pump means, the indicia of said display means being mounted to said spray gun and sized so as to be continuously visible and intelligible to the operator during operation of said spray gun.

22. The apparatus of claim 21, in which said pump means operates cyclically and pumps a determinate amount of liquid resin with each cycle thereof, the indicia of said display means being a numerical display wherein the number displayed is directly proportional to a cumulative amount of liquid resin pumped.

23. The apparatus of claim 22, in which said display means includes means for counting cycles of said pump means and the number displayed by the numerical display is directly proportional to the number of cycles counted.

24. The apparatus of claim 23, in which said display means is mounted to said spray gun.

25. The apparatus of claim 23, in which the means for counting includes electronic counter means electrically connected to the momentary electrical switch and responsive thereto for counting the number of switch closures.

26. The apparatus of claim 25, in which the electronic counter means is mounted to said spray gun.

27. The apparatus of claim 26, in which the electronic counter means is potted in a material which is resistant to solvent.

* * * * *